United States Patent
Dragash, Jr.

(10) Patent No.: US 6,236,128 B1
(45) Date of Patent: May 22, 2001

(54) RADIAL LEAD SPANNER NUT ASSEMBLY WITH INTEGRAL SEALS FOR HYDROGEN-COOLED POWER GENERATORS AND ASSOCIATED METHODS

(75) Inventor: John M. Dragash, Jr., Melbourne, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/429,098

(22) Filed: Oct. 28, 1999

(51) Int. Cl.$^7$ ............ H02K 17/30; H02K 5/10; F16J 15/24

(52) U.S. Cl. .......... 310/85; 310/67 R; 310/261; 277/1; 277/110; 277/124

(58) Field of Search ............ 310/261, 270, 310/271, 272, 85, 86; 277/421, 429, 420, 419, 347, 412, 430, 350, 351, 418, 53; 29/888.3

(56) References Cited

U.S. PATENT DOCUMENTS

| | | | |
|---|---|---|---|
| 3,004,783 | 10/1961 | Webb | 286/12 |
| 3,070,070 | 12/1962 | Trevor | 121/38 |
| 3,186,724 | 6/1965 | Wheatley | 277/59 |
| 3,244,424 | 4/1966 | Cope | 277/4 |
| 3,419,280 | 12/1968 | Wheeler | 277/123 |
| 3,472,522 | 10/1969 | Winfrey | 277/41 |
| 3,595,585 | 7/1971 | Bristow | 277/58 |
| 3,599,990 | * 8/1971 | Greiner et al. | 277/4 |
| 4,512,586 | 4/1985 | Smith | 277/124 |
| 4,602,791 | 7/1986 | Zollner | 277/188 |
| 4,799,690 | 1/1989 | Gabriele | 277/9 |
| 4,838,583 | * 6/1989 | Babuder et al. | 285/354 |
| 4,989,883 | 2/1991 | Orlowski | 277/25 |
| 5,069,461 | 12/1991 | Orlowski | 277/25 |
| 5,145,219 | * 9/1992 | Babuder | 277/236 |
| 5,577,737 | 11/1996 | Lacy | 277/1 |
| 5,636,688 | * 6/1997 | Bassinger | 166/84.4 |

* cited by examiner

Primary Examiner—Tran Nguyen (57) ABSTRACT

A radial lead spanner nut assembly (60) for preventing leakage of hydrogen gas in hydrogen-cooled power generators, an apparatus (50), and method are provided. The radial lead spanner nut assembly (60) is preferably mounted to a radial lead (26) positioned in a radial bore (37) of a generator rotor body (21) of a power generator. The radial lead spanner nut assembly (60) preferably has a radial lead spanner nut body (61), nut threads (62) positioned on the outer peripheries of the nut body (61) for abuttingly contacting a radial bore (37) along the bore threads (32) thereof, and a plurality of spaced-apart seal channels (64, 66, 68) formed in peripheries of non-threaded portions of the nut body (61). The plurality of spaced-apart seal channels (64, 66, 68) include at least a first seal channel (64) formed in outer peripheries of the nut body (61) adjacent non-threaded portions of the radial bore (37) and at least a second seal channel (66) formed in inner peripheries of the nut body (61) adjacent the radial lead (26). The radial lead spanner nut assembly (60) also preferably includes first and second seal members (65, 67) respectively positioned in the first and second seal channels (64, 66). The first seal member (65) preferably abuttingly contacts non-threaded portions of the radial bore (37), and the second seal member (67) preferably abuttingly contacts the radial lead (26).

20 Claims, 6 Drawing Sheets

RADIAL LEAD SPANNER NUT ASSEMBLY WITH INTEGRAL SEALS FOR HYDROGEN-COOLED POWER GENERATORS AND ASSOCIATED METHODS

FIELD OF THE INVENTION

This invention is related to the power generation industry and, more particularly, to the field of hydrogen-cooled power generators.

BACKGROUND OF THE INVENTION

In the power generation industry, an exciter is often positioned in axial alignment with a generator rotor which, in turn, is positioned in axial alignment with a turbine. The exciter is often a direct current ("DC") source and provides a current source to the generator rotor 20 through an axial lead (e.g., positive or negative) 22 positioned in an axial rotor bore 24 of the generator rotor body 21. As shown in prior art FIG. 1, an electrical path is provided to and from the axial lead 22 to coils 25 by two or more radial leads 26 which contact the axial lead 22 through radial bores 27 in the body 21 of the generator rotor 20 (see FIG. 1). The radial leads 26 are attached to the axial lead 22 by threads in the radial bores 27 and corresponding threads on the leads 22 themselves. A threaded spanner nut 30 positioned in a proximal portion of the radial bore 27 conventionally also assists in mounting the radial lead 26 to the axial lead 22. The radial lead 26 then connects to one of the coils 25 through a strap 29 which is secured to the radial lead 26 by a fastener assembly 28, and a current path is provided from the axial lead 22 through the radial lead 26, through the strap 29, and to the coils 25. Also, another portion of the coils 25 connects to another radial lead 26 which, in turn, again is connected to the axial lead 22 so that a positive to negative current path is established.

A hydrogen-cooled power generator within such a system often includes a housing which is sealed to prevent leakage of hydrogen gas positioned within the housing. The hydrogen gas is used to cool the generator. The hydrogen gas is conventionally at a much higher pressure within the housing than that of the atmospheric pressure outside the housing. If the hydrogen gas leaks from the housing, for example, the gas is potentially explosive and can cause various ventilation and environmental problems. The generator rotor is also positioned within the housing.

Figure 1:
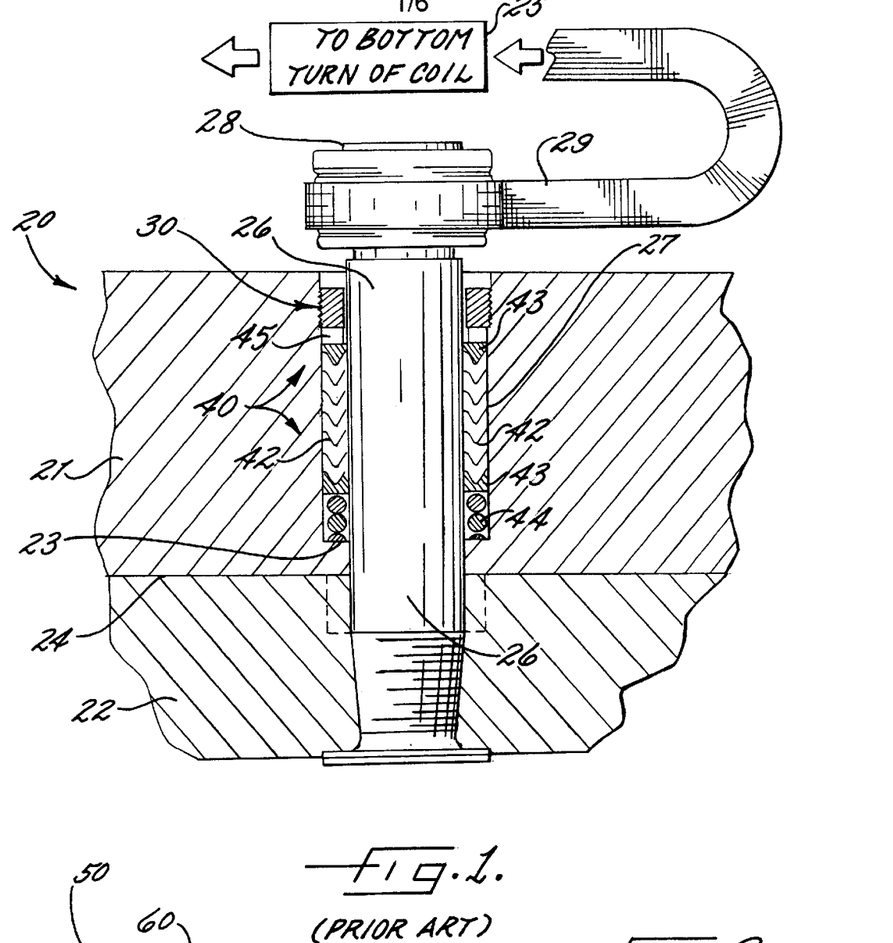
FIG. 1 is a fragmentary perspective view of a radial lead spanner nut and a separate sealing assembly positioned in a radial lead bore of a generator rotor body according to the prior art.
Figure 2:
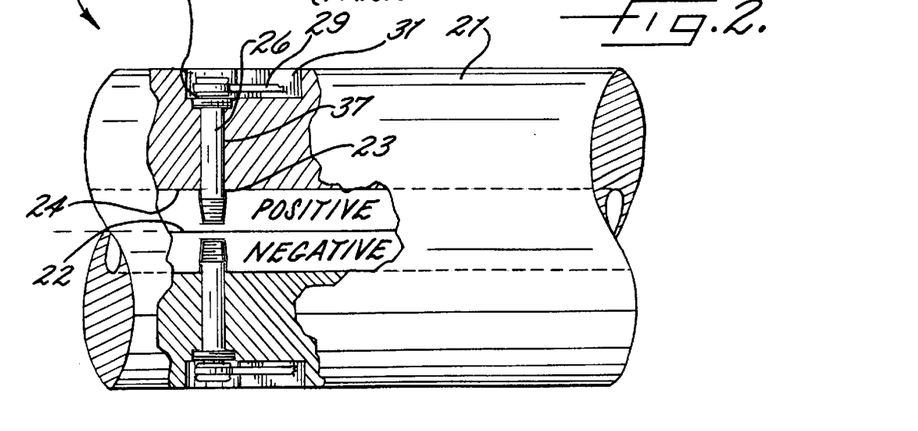
FIG. 2 is a fragmentary sectional view of an apparatus having a radial lead spanner nut assembly according to a first embodiment of the present invention.
Figures 3, 4, 5, 6:
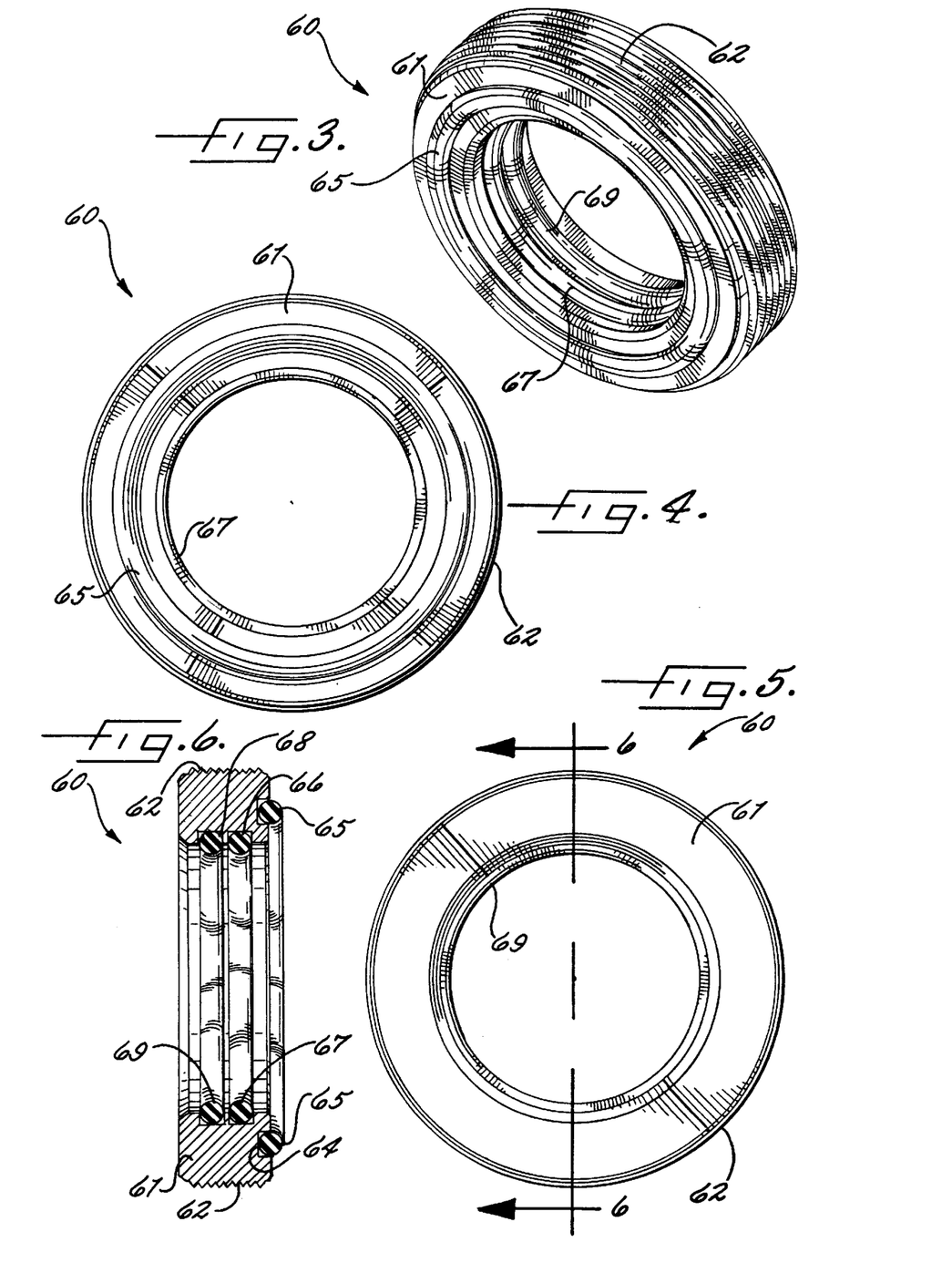
FIG. 3 is a perspective view of a first embodiment of a radial lead spanner nut assembly for an apparatus according to the present invention.
FIG. 4 is a bottom plan view of a first embodiment of a radial lead spanner nut assembly for an apparatus according to the present invention.
FIG. 5 is a top plan view of a first embodiment of a radial lead spanner nut assembly for an apparatus according to the present invention.
FIG. 6 is a sectional view of a first embodiment of a radial lead spanner nut assembly taken along line 6—6 of FIG. 5 for an apparatus according to the present invention.
Figure 7:
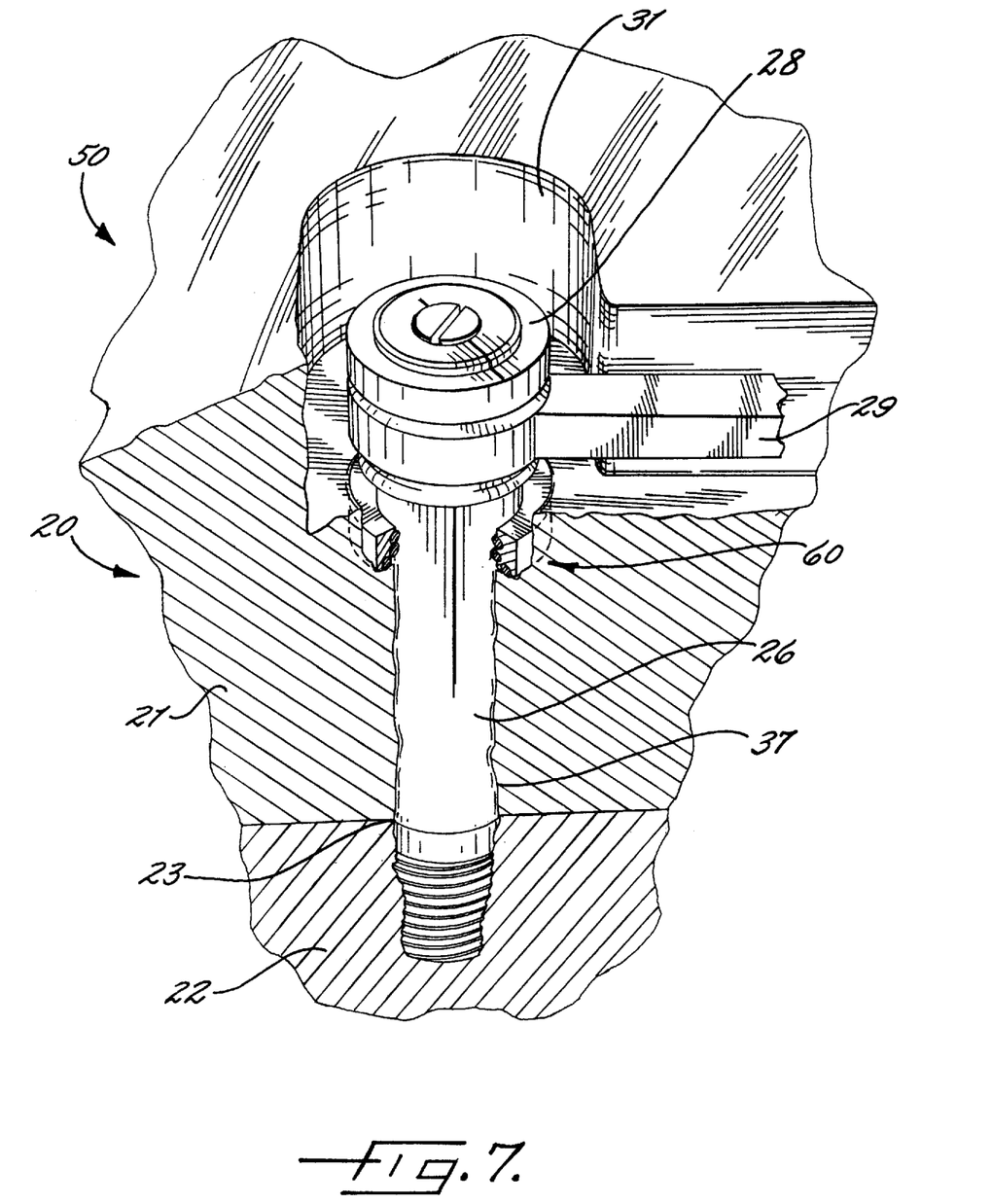
FIG. 7 is a fragmentary perspective view of a radial lead spanner nut assembly for an apparatus according to a first embodiment of the present invention.
Figure 8:
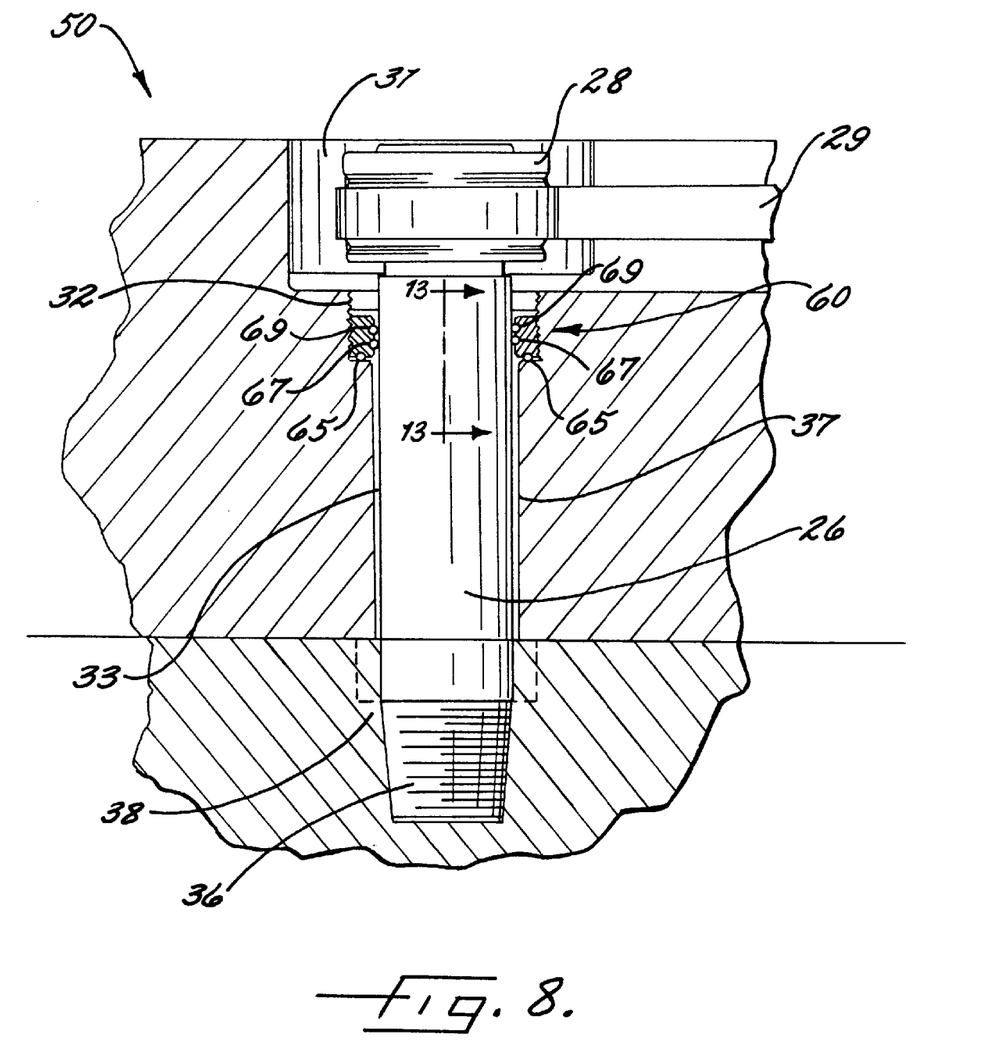
FIG. 8 is a side elevational view of a radial lead spanner nut assembly for an apparatus according to a first embodiment of the present invention.
Figure 9:
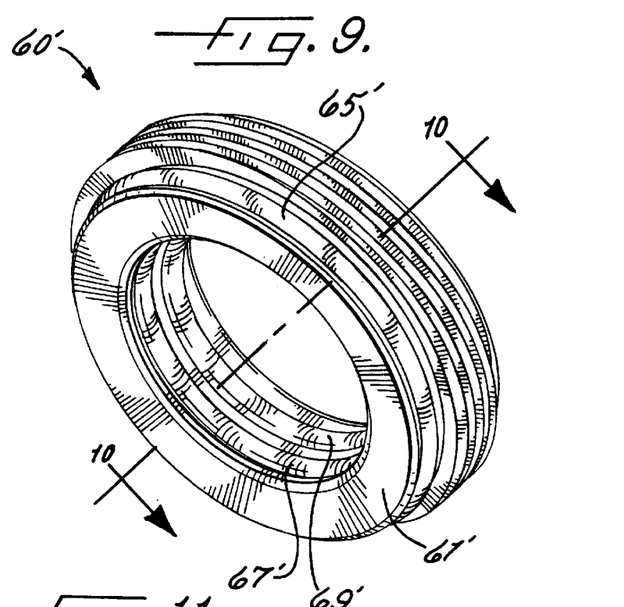
FIG. 9 is a perspective view of a second embodiment of a radial lead spanner nut assembly for an apparatus according to the present invention.
Figure 10:
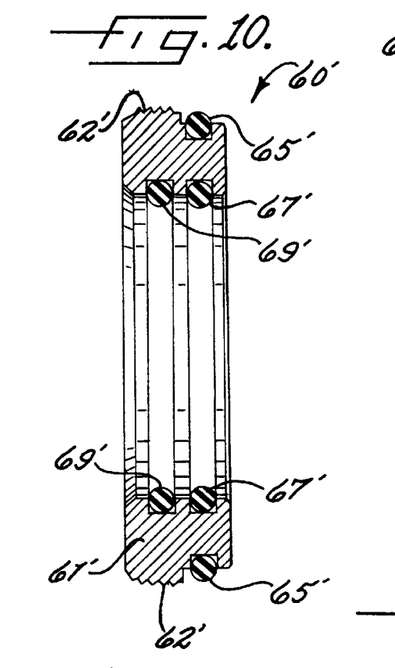
FIG. 10 is a sectional view of a second embodiment of a radial lead spanner nut assembly for an apparatus according to the present invention.
Figure 11:
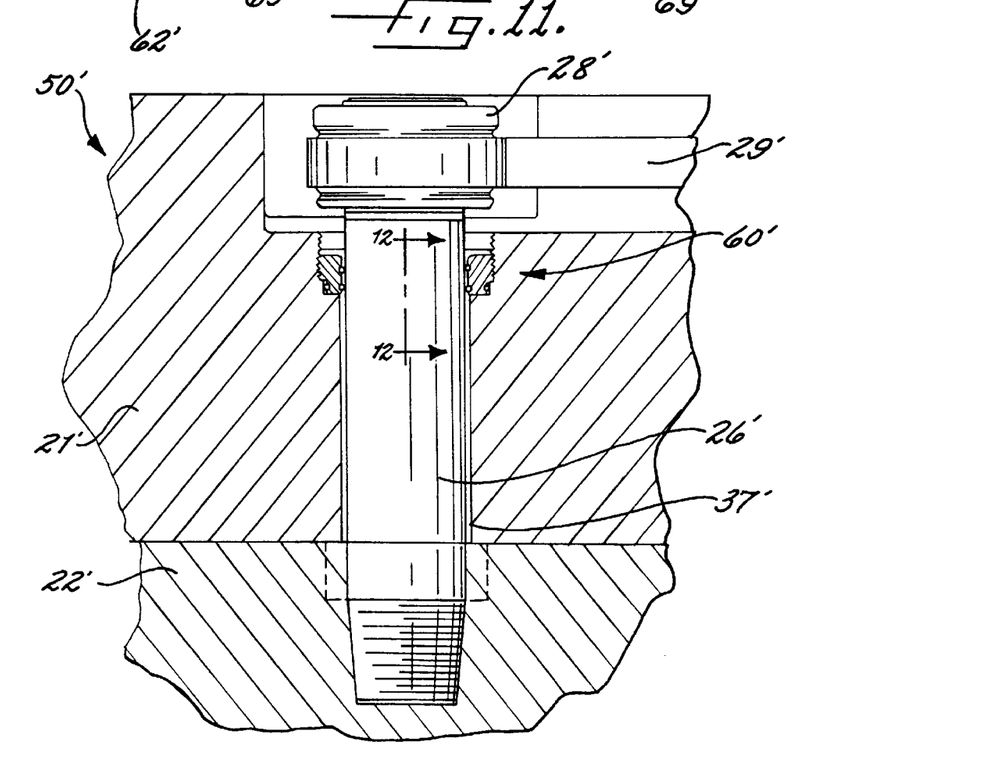
FIG. 11 is a sectional side elevational view of an apparatus having a radial lead spanner nut assembly according to a second embodiment of the present invention.
Figure 12:
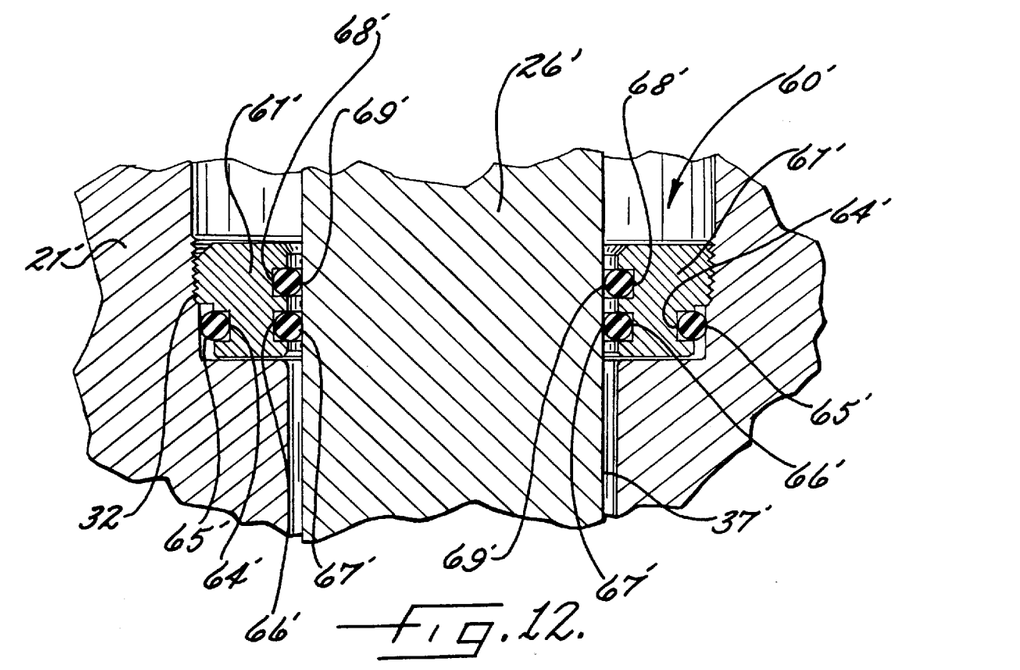
FIG. 12 is an enlarged fragmentary sectional view of an apparatus having a radial lead spanner nut assembly according to a second embodiment of the present invention.
Figure 13:
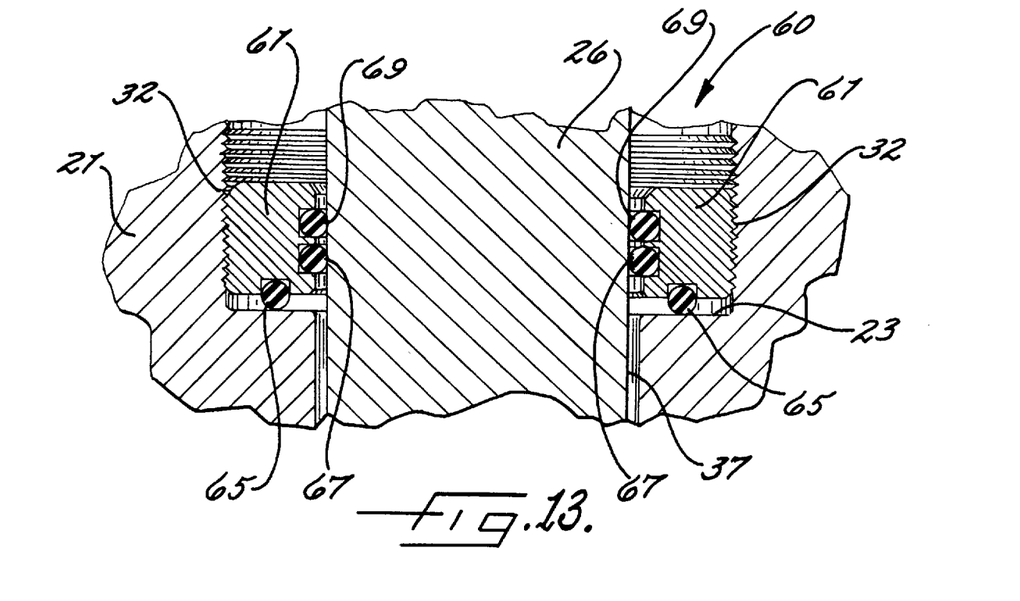
FIG. 13 is an enlarged fragmentary sectional view of an apparatus having a radial lead spanner nut assembly according to a first embodiment of the present invention.

In addition to leakage from suspected locations or openings to and from the housing, other areas of the generator rotor are also susceptible to leakage such as through the axial lead, e.g., due to the pressure differential within and outside the housing. Access to the axial lead, for example, can be achieved by gas passing along outer peripheries of the radial bores. As shown in FIG. 1, to prevent such a leakage a complex sealing assembly 40 is conventionally used, including numerous sealing members, e.g., Chevron seals 42, and sealing hardware, e.g., washers 43, a spring 44, spacers 45. This complex assembly 40 is separate from the radial lead spanner nut 30, and can take extensive time and be costly to manufacture, can be complex to assemble and install, can be difficult to remove, and can be difficult to handle. For example, if portions of the sealing assembly 40 are not placed into position correctly the first time, then jamming within the radial lead bore 27 can occur. Also, the conventional sealing assembly 40, for example, requires an axial load applied by the spring 44 in order to activate the seals.

SUMMARY OF THE INVENTION

In view of the foregoing, the present invention advantageously provides a radial lead spanner nut assembly and method of sealing a radial lead bore for preventing leakage of hydrogen gas in a hydrogen-cooled power generator which eliminates the need for a separate seal assembly for sealing a radial lead bore within the body of a generator rotor. The present invention also advantageously provides a radial lead spanner nut assembly and associated methods which makes installation, handling, and removal of a seal for a radial lead bore much easier. The present invention additionally advantageously provides an apparatus for preventing leakage of hydrogen gas in a hydrogen-cooled power generator having a radial lead spanner nut assembly which costs substantially less to manufacture without sacrificing reliability. The present invention further advantageously provides a radial lead spanner nut having integrated seals which functions as a self-contained seal cartridge to prevent gas leaks around the radial lead through the radial lead bore and which can easily accommodate various types of power generators.

More particularly, an apparatus is provided for preventing leakage of hydrogen gas in a hydrogen-cooled power generator. The apparatus preferably includes a power generator having a rotor body including a rotor bore and an axial lead positioned within the rotor bore for providing a current path through the rotor and a radial bore formed in the rotor body and extending from an outer surface of the rotor body to the axial lead. The radial bore preferably has a first predetermined diameter and a second predetermined diameter greater than the first predetermined diameter so that a transition region from the first predetermined diameter to the second predetermined diameter defines a bore shoulder. The radial bore also preferably includes bore threads positioned along proximal end portions of the radial bore. A radial lead is positioned in the radial bore and has distal end portions connected to the axial lead of the rotor body. A radial lead spanner nut assembly is preferably mounted to the radial lead and has portions thereof abuttingly contacting the outer peripheries of the radial bore and the radial lead. The radial lead spanner nut assembly preferably includes a radial lead spanner nut body, nut threads positioned on the outer peripheries of the nut body and abuttingly contacting the radial bore along the bore threads thereof, and a plurality of spaced-apart seal channels formed in peripheries of non-threaded portions of the nut body. The plurality of spaced-apart seal channels includes at least a first seal channel formed in outer peripheries of the nut body adjacent non-threaded portions of the radial bore and at least a second seal channel formed in inner peripheries of the nut body adjacent the radial lead. The radial lead spanner nut assembly further includes first and second seal members respectively positioned in the first and second seal channels. The first seal member is positioned to abuttingly contact non-threaded portions of the radial bore, and the second seal member is positioned to abuttingly contact the radial lead.

The present invention also provides a radial lead spanner nut assembly for preventing leakage of hydrogen gas in hydrogen-cooled power generators. The spanner nut assembly is preferably mounted to a radial lead positioned in a radial bore of a generator rotor of a power generator. The radial lead spanner nut assembly preferably has a radial lead spanner nut body, nut threads positioned on the outer peripheries of the nut body for abuttingly contacting a radial bore along the bore threads thereof, and a plurality of spaced-apart seal channels formed in peripheries of non-threaded portions of the nut body. The plurality of spaced-apart seal channels include at least a first seal channel formed in outer peripheries of the nut body adjacent non-threaded portions of the radial bore and at least a second seal channel formed in inner peripheries of the nut body adjacent the radial lead. The radial lead spanner nut assembly also preferably includes first and second seal members respectively positioned in the first and second seal channels. The first seal member preferably abuttingly contacts non-threaded portions of the radial bore, and the second seal member preferably abuttingly contacts the radial lead.

The present invention further provides a method for preventing leakage of hydrogen gas from a hydrogen-cooled power generator. The method preferably includes the steps of mounting a radial lead spanner nut assembly to a radial lead positioned in a radial bore of a generator rotor body of a power generator. The radial lead spanner nut assembly preferably has a radial lead spanner nut body, nut threads positioned on the outer peripheries of the nut body for abuttingly contacting a radial bore along bore threads thereof, and a plurality of spaced-apart seal channels formed in peripheries of non-threaded portions of the nut body. The plurality of spaced-apart seal channels preferably includes at least a first seal channel formed in outer peripheries of the nut body adjacent non-threaded portions of the radial bore and at least a second seal channel formed in inner peripheries of the nut body adjacent the radial lead. The radial lead spanner nut assembly also preferably includes first and second seal members respectively positioned in the first and second seal channels. The method also includes abuttingly contacting the first seal member of the radial lead spanner nut assembly to non-threaded portions of the radial bore and the second seal member of the radial lead spanner nut assembly to the radial lead to thereby prevent hydrogen gas from passing from outside of the rotor body through the radial bore and around the radial lead.

The apparatus, the radial lead spanner nut assembly, and the method of the present invention greatly reduces the seal hardware and associated components which result in shorter manufacturing lead times for fabrication of the radial lead spanner nut assembly. The present invention also speeds installation and reduces time required for inspection and/or replacement of radial lead seals. The radial lead spanner nut assembly of the present invention also allows the nut body to be designed only once. Then the diameters of the nut body and seal members can be adjusted to accommodate various styles and sizes of power generator rotor bodies with no or little change to the radial lead or the radial lead bore. By using O-ring members for the seal members of the radial lead spanner nut assembly, cost can be minimized, and such sealing members are quite effective in hydrogen gas environments.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation, if used, indicate similar elements in alternative embodiments. Also, references similar to FIG. 1 elements described previously will use the same numbers.

As illustrated in FIGS. 2–13, an apparatus 50 is provided for preventing leakage of hydrogen gas in a hydrogen-cooled power generator. As perhaps best shown in FIG. 2, the apparatus 50 preferably includes a power generator having a rotor 20 which includes a rotor body 21, e.g., preferably having a substantially cylindrical shape, including a rotor bore 24 and an axial lead 22 positioned within the rotor bore 24 for providing a current path through the rotor 20. A radial bore 37 is preferably formed in the rotor body 21 and extends from an outer surface, e.g., the outside diameter, of the rotor body 21 to the axial lead 22, e.g., extending through the inside diameter. As shown in FIGS. 2, 7–8, and 11–13, the radial bore 37 preferably has a first predetermined diameter and a second predetermined diameter greater than the first predetermined diameter so that a transition region from the first predetermined diameter to the second predetermined diameter defines a bore shoulder 23. In a first embodiment of the apparatus 50 (see FIGS. 2 and 7–8), the bore shoulder 23 is positioned in distal portions and proximal portions of the radial bore 37. In a second embodiment of the apparatus 50 (see FIGS. 11–13), the bore shoulder 23 is positioned in proximal portions of the radial bore 37. The radial bore 37 also preferably includes bore threads 32 positioned along proximal end portions of the radial bore 37. The radial bore 37 preferably also has smooth portions 33 along other lengthwise extending regions as shown.

As also shown in FIGS. 2, 7–8, and 11–13, the apparatus 50 also has a radial lead 26 positioned in the radial bore 37 and has distal end portions connected to the axial lead 22 of the rotor body 21. Distal end portions of the radial lead 26 have radial lead threads 36 formed therein. Additionally, distal end portions of the radial bore 37 have threads 38 formed therein and within the axial lead 22 so that the distal threaded portions 36 of the radial lead 26 abuttingly contact the axial lead 22 through the distal threaded portions 38 of the radial bore 26. A strap 29 is also connected to the radial lead 26 to provide the conductive path from the radial lead 26 to the coils 25 as previously described. A pocket 31 is preferably formed in the rotor body 21 to assist in the ease of attaching and detaching of the strap 29.

The apparatus 50 of the present invention also advantageously has a radial lead spanner nut assembly 60 which is preferably mounted to the radial lead 26 and has portions thereof abuttingly contacting the outer peripheries of the radial bore 37 and the radial lead 26 (see FIGS. 7–8 and 11–13). As shown in FIGS. 3–6, 9–10, and 12–13, the radial lead spanner nut assembly 60 preferably includes a radial lead spanner nut body 61, nut threads 62 positioned on the outer peripheries of the nut body 61 and abuttingly contacting the radial bore 37 along the bore threads 32 thereof, and a plurality of spaced-apart seal channels 64, 66, 68 formed in peripheries of non-threaded portions of the nut body 61. The plurality of spaced-apart seal channels 64, 66, 68 includes at least a first seal channel 64 formed in outer peripheries of the nut body 61 adjacent non-threaded portions of the radial bore 37 and at least a second seal channel 66 formed in inner peripheries of the nut body 61 adjacent the radial lead 26. The radial lead spanner nut assembly 60 further includes first and second seal members 65, 67 respectively positioned in the first and second seal channels 64, 66. The first seal member 65 is positioned to abuttingly contact non-threaded portions of the radial bore 37, and the second seal member 67 is positioned to abuttingly contact the radial lead 26 so that gas does not pass the seal members 65, 67. The first and second seal members 65, 67 each are preferably provided by an elastomeric o-ring member as well understood by those skilled in the art. The o-ring members are preferably formed of Neoprene, as understood by those skilled in the art, or a rubber material. Such o-ring members can be quite effective for sealing in a hydrogen gas environment. For example, a nut body 61 of a radial lead spanner nut assembly 60 can easily be machined to form the channels 64, 66, 68 and to receive the o-ring members therein to thereby provide a removable and self-contained cartridge format.

According to the present invention, the radial lead spanner nut assembly 60 also preferably includes the plurality of seal channels 64, 66, 68 having a third seal channel 68 positioned spaced-apart from the second seal channel 66 and positioned adjacent the radial lead 26 and a third seal member 69, e.g., preferably also provided by an elastomeric o-ring member, positioned in the third seal channel 68 and abuttingly contacting the radial lead 26. This additional sealing member 69 advantageously provides redundancy within the assembly 60 to further assure sealing around the radial lead 26. Primarily due to the threads of the nut body 61 and the radial bore 37, redundancy on the outer peripheries of the nut body 61 is not thought necessary, but can be added as well, if desired, according to the present invention.

As illustrated, the outer peripheries of the nut body 61, 61' in which the first seal channel 64, 64' is positioned can also advantageously be positioned in either a plane substantially parallel to the second seal channel 66' (see FIGS. 9–12) or in a plane transverse to the plane of the second seal channel 66 (see FIGS. 3–8 and 13). The parallel plane, for example, advantageously can prevent the seal members 65', 67', 69' from separating from the nut body 61' when the assembly 60' is positioned in some orientations. The channels 64', 66', 68' from the outer and inner peripheries can also advantageously be aligned to make design and/or machining of the channels 64', 66', 68' easier. Each of the channels 64, 64', 66, 66', 68, 68' preferably has a similar depth and width as illustrated.

As illustrated in FIGS. 2–13, the present invention also provides a method for preventing leakage of hydrogen gas from a hydrogen-cooled power generator. The method preferably includes the steps of mounting a radial lead spanner nut assembly 60 to a radial lead 26 positioned in a radial bore 37 of a generator rotor body 21 of a power generator. The radial lead spanner nut assembly 60 preferably has a radial lead spanner nut body 61, nut threads 62 positioned on the outer peripheries of the nut body 61 for abuttingly contacting a radial bore 37 along bore threads 32 thereof, and a plurality of spaced-apart seal channels 64, 66, 68 formed in peripheries of nonthreaded portions of the nut body 61. The plurality of spaced-apart seal channels 64, 66, 68 preferably includes at least a first seal channel 64 formed in outer peripheries of the nut body 61 adjacent non-threaded portions of the radial bore 37 and at least a second seal channel 66 formed in inner peripheries of the nut body 61 adjacent the radial lead 26. The radial lead spanner nut assembly 60 also preferably includes first and second seal members 65, 67 respectively positioned in the first and second seal channels 64, 66. The method also includes abuttingly contacting the first seal member 65 of the radial lead spanner nut assembly 60 to non-threaded portions of the radial bore 37 and the second seal member 67 of the radial lead spanner nut assembly 60 to the radial lead 26, e.g., tightened by the threads to a tight or secure position, to thereby prevent hydrogen gas from passing from outside of the rotor body 21 through the radial bore 37 and around the radial lead 26 to the axial lead 22, through the axial rotor bore 24, and from the housing of the power generator.

Also, according to the method of the present invention, the first and second seal member 65, 67 each include an elastomeric O-ring member, and the plurality of seal channels 64, 66, 68 of the radial lead spanner nut assembly 60 includes a third seal channel 68 positioned spaced-apart from the second seal channel 66 and positioned adjacent the radial lead 26. The radial lead spanner nut assembly 60 further includes a third seal member 69 positioned in the third seal channel 68, and the method further includes abuttingly contacting the third seal member 69 with the radial lead 26 during insertion of the assembly 60 into the radial bore 37. The outer peripheries of the nut body 61 in which the first seal channel 64, 64' is positioned can be either in a plane substantially parallel to the second seal channel 66' or in a plane transverse to the plane of the second seal channel 66.

Additionally, according to the method, the radial bore 37 can have a first predetermined diameter and a second predetermined diameter greater than the first predetermined diameter so that a transition region from the first predetermined diameter to the second predetermined diameter defines a bore shoulder 23. The bore threads of the radial bore 37 are positioned along proximal end portions of the radial bore 37. The bore shoulder 23 can be positioned in distal portions of the radial bore and/or in proximal portions of the radial bore 37.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed:

1. An apparatus for preventing leakage of hydrogen gas in a hydrogen-cooled power generator, the apparatus comprising:

a power generator having a rotor body including a rotor bore and an axial lead positioned within the rotor bore for providing a current path through the rotor;

a radial bore formed in the rotor body and extending from an outer surface of the rotor body to the axial lead, the radial bore having a first predetermined diameter and a second predetermined diameter greater than the first predetermined diameter so that a transition region from the first predetermined diameter to the second predetermined diameter defines a bore shoulder, the radial bore including bore threads positioned along proximal end portions of the radial bore;

a radial lead positioned in the radial bore and having distal end portions connected to the axial lead of the rotor body; and a radial lead spanner nut assembly mounted to the radial lead and having portions thereof abuttingly contacting the outer peripheries of the radial bore and the radial lead, the radial lead spanner nut assembly including a radial lead spanner nut body, nut threads positioned on the outer peripheries of the nut body and abuttingly contacting the radial bore along the bore threads thereof, a plurality of spaced-apart seal channels formed in peripheries of non-threaded portions of the nut body, the plurality of spaced-apart seal channels including at least a first seal channel formed in outer peripheries of the nut body adjacent non-threaded portions of the radial bore and at least a second seal channel formed in inner peripheries of the nut body adjacent the radial lead, and first and second seal members respectively positioned in the first and second seal channels, the first seal member abuttingly contacting non-threaded portions of the radial bore and the second seal member abuttingly contacting the radial lead.

2. An apparatus as defined in claim 1, wherein the first and second seal member each comprise an elastomeric O-ring member, wherein distal end portions of the radial lead have radial lead threads formed therein, and wherein distal end portions of the radial bore have threads formed therein and within the axial lead so that the distal threaded portions of the radial lead abuttingly contact the axial lead through the distal threaded portions of the radial bore.

3. An apparatus as defined in claim 1, wherein the plurality of seal channels includes a third seal channel positioned spaced-apart from the second seal channel and positioned adjacent the radial lead, and wherein the radial lead spanner nut assembly further comprises a third seal member positioned in the third seal channel and abuttingly contacting the radial lead.

4. An apparatus as defined in claim 1, wherein the outer peripheries of the nut body in which the first seal channel is positioned are in a plane substantially parallel to the second seal channel.

5. An apparatus as defined in claim 1, wherein the outer peripheries of the nut body in which the first seal channel is positioned are in a plane transverse to the plane of the second seal channel.

6. An apparatus as defined in claim 1, wherein the bore shoulder is positioned in distal portions of the radial bore.

7. An apparatus as defined in claim 1, wherein the bore shoulder is positioned in proximal portions of the radial bore.

8. A radial lead spanner nut assembly for mounting to a radial lead positioned in a radial bore of a generator rotor of a power generator, the radial lead spanner nut assembly comprising:

a radial lead spanner nut body;

nut threads positioned on the outer peripheries of the nut body for abuttingly contacting threads of a radial bore of a rotor in a power generator;

a plurality of spaced-apart seal channels formed in peripheries of non-threaded portions of the nut body, the plurality of spaced-apart seal channels including at least a first seal channel formed in outer peripheries of the nut body adjacent non-threaded portions of the radial bore and at least a second seal channel formed in inner peripheries of the nut body adjacent a radial lead of the rotor; and first and second seal members respectively positioned in the first and second seal channels, the first seal member abuttingly contacting non-threaded portions of the radial bore and the second seal member abuttingly 20 contacting the radial lead.

9. An apparatus as defined in claim 8, wherein the first and second seal member each comprise an elastomeric O-ring member.

10. An apparatus as defined in claim 9, wherein the plurality of seal channels includes a third seal channel positioned spaced-apart from the second seal channel and positioned adjacent the radial lead, and wherein the radial lead spanner nut assembly further comprises a third seal member positioned in the third seal channel and abuttingly contacting the radial lead.

11. An apparatus as defined in claim 10, wherein the outer peripheries of the nut body in which the first seal channel is positioned are in a plane substantially parallel to the second seal channel.

12. An apparatus as defined in claim 10, wherein the outer peripheries of the nut body in which the first seal channel is positioned are in a plane transverse to the plane of the second seal channel.

13. A method for preventing leakage of hydrogen gas from a hydrogen-cooled power generator, the method comprising the steps of:

mounting a radial lead spanner nut assembly to a radial lead positioned in a radial bore of a generator rotor body of a power generator, the radial lead spanner nut assembly having a radial lead spanner nut body, nut threads positioned on the outer peripheries of the nut body for abuttingly contacting a radial bore along bore threads thereof, a plurality of spaced-apart seal channels formed in peripheries of non-threaded portions of the nut body, the plurality of spaced-apart seal channels including at least a first seal channel formed in outer peripheries of the nut body adjacent non-threaded portions of the radial bore and at least a second seal channel formed in inner peripheries of the nut body adjacent the radial lead, and first and second seal members respectively positioned in the first and second seal channels; and abuttingly contacting the first seal member of the radial lead spanner nut assembly to non-threaded portions of the radial bore and the second seal member of the radial lead spanner nut assembly to the radial lead to thereby prevent hydrogen gas from passing from outside of the rotor body through the radial bore and around the radial lead.

14. A method as defined in claim 13, wherein the first and second seal member each comprise an elastomeric O-ring member.

15. A method as defined in claim 13, wherein the plurality of seal channels of the radial lead spanner nut assembly includes a third seal channel positioned spaced-apart from the second seal channel and positioned adjacent the radial lead, and wherein the radial lead spanner nut assembly further comprises a third seal member positioned in the third seal channel, and the method further comprises the step of abuttingly contacting the third seal member with the radial lead.

16. A method as defined in claim 13, wherein the outer peripheries of the nut body in which the first seal channel is positioned are in a plane substantially parallel to the second seal channel.

17. A method as defined in claim 13, wherein the outer peripheries of the nut body in which the first seal channel is positioned are in a plane transverse to the plane of the second seal channel.

18. A method as defined in claim 13, wherein the radial bore has a first predetermined diameter and a second predetermined diameter greater than the first predetermined diameter so that a transition region from 5 the first predetermined diameter to the second predetermined diameter defines a bore shoulder, and wherein the bore threads of the radial bore are positioned along proximal end portions of the radial bore.

19. A method as defined in claim 18, wherein the bore shoulder is positioned in distal portions of the radial bore.

20. A method as defined in claim 18, wherein the bore shoulder is positioned in proximal portions of the radial bore.

* * * * *